United States Patent
Knapp

[11] Patent Number: 5,931,374
[45] Date of Patent: Aug. 3, 1999

[54] FLOW CONTROL PORTS FOR A THERMOSTATIC MIXING FAUCET

[75] Inventor: Alfons Knapp, Klockstr, Germany

[73] Assignee: Masco Corporation, Taylor, Mich.

[21] Appl. No.: 08/973,852

[22] PCT Filed: Jun. 24, 1996

[86] PCT No.: PCT/US96/10773

§ 371 Date: Dec. 22, 1997

§ 102(e) Date: Dec. 22, 1997

[87] PCT Pub. No.: WO97/01807

PCT Pub. Date: Jan. 16, 1997

[30] Foreign Application Priority Data

Jun. 27, 1995 [IT] Italy ................................ TO95A0533

[51] Int. Cl.⁶ .................................................. G05D 23/13
[52] U.S. Cl. ..................................... 236/12.2; 137/625.41
[58] Field of Search ....................... 236/12.2; 137/625.41

[56] References Cited

U.S. PATENT DOCUMENTS

| | | |
|---|---|---|
| 2,558,962 | 7/1951 | Kempton . |
| 3,171,441 | 3/1965 | Schonfeld ............................ 137/637.4 |
| 3,685,728 | 8/1972 | Chapou . |
| 3,765,604 | 10/1973 | Trubert et al. . |
| 3,827,016 | 7/1974 | Knapp . |
| 3,987,819 | 10/1976 | Scheuermann ........................ 137/637.3 |
| 4,327,758 | 5/1982 | Uhlmann ............................. 137/625.17 |
| 4,457,452 | 7/1984 | Symmons . |
| 4,674,678 | 6/1987 | Knebel et al. . |
| 4,738,393 | 4/1988 | Bergmann et al. . |
| 4,823,841 | 4/1989 | Graber ............................... 137/624.41 |
| 5,129,576 | 7/1992 | Pullen et al. . |
| 5,340,018 | 8/1994 | MacDonald ........................... 236/12.2 |
| 5,341,845 | 8/1994 | Graber .............................. 137/625.41 |
| 5,505,225 | 4/1996 | Niakan ................................ 137/315 |

FOREIGN PATENT DOCUMENTS

| | | |
|---|---|---|
| 109 7777 | 1/1961 | Germany . |
| 2 120 752 | 3/1983 | United Kingdom . |
| WO 90/03604 | 4/1990 | WIPO . |
| WO 95/30939 | 11/1995 | WIPO . |
| WO 95/30940 | 11/1995 | WIPO . |

Primary Examiner—William E. Tapolcai
Attorney, Agent, or Firm—Reising, Ethington, Barnes, Kisselle, et al

[57] ABSTRACT

Two flow control ceramic discs (22 and 24) for a thermostatic valve (10) has ports to adjust water flow from a closed to a full open position. Ceramic disc (24) has a contoured inlet (32) that has a wide section (92) and narrow section (90) that provide varying flow adjustment with respect to the other port (30). The contoured port provides for increased capacity of mixing adjustment for the thermostatic element (70) during different manual flow adjustments.

10 Claims, 3 Drawing Sheets

FLOW CONTROL PORTS FOR A THERMOSTATIC MIXING FAUCET

TECHNICAL FIELD

The field of this invention relates to a thermostatically controlled mixing valve and more particularly to a thermostatic controlled mixing valve with a volume control feature incorporated therein.

BACKGROUND OF THE DISCLOSURE

Mixing valves are well known and common in the plumbing field. These valves provide a flow of mixed water from separate hot and cold water supplies. Secondly, thermostatic control for handle mixer valves are well known. One reason for thermostatic control is to eliminate constant readjustment of the valve when the temperature of the hot water supply fluctuates. The temperature of the hot water supply may vary substantially. Furthermore, the pressure within the cold water line may also vary thus changing the proportions of hot and cold water flow and thereby fluctuating the temperature of the mixed water.

Known thermostatic valves have packaging problems and are often significantly bulkier than standard mixing valves that do not incorporate the thermostatic regulation. This bulkiness is due to the flow path that has always been used for thermostatic faucets, namely the supply inlets approach the centrally located thermostatic valve from a radially outer position.

When thermostatic valves are incorporated into mixer valves, the volume or flow control valves may be installed either downstream or upstream from the thermostatic valve element. When the flow is regulated downstream of the thermostatic element within the mixed water flow, installation of non-return valves are needed in order to prevent the possibility of communication between the hot water supply and the cold water supply. When volume control of the hot and cold water supplies is upstream of the thermostatic valve before the water is mixed, the return valves are not needed. For this economic reason, most thermostatic mixing valves have the volume control upstream of the thermostatic element.

However when the flow is regulated with respect to the hot and cold water supplies, the thermostatic device is unable to maintain the constant temperature due to the variations of the flow rates. It is well known that when hot and cold water supply pressures are approximately equal or with the hot supply pressure being only slightly lower than the cold water pressure, the difference in flow rate or variation between the hot and cold water supplies is increased when the total flow is reduced and the rise in temperature can sometimes become significant. On the other hand, if the hot water supply pressure is substantially lower than the cold water supply pressure, as in often the case due the increased corrosion of the hot water pipelines, the difference in the flow rate or variation of the flow rate between the hot and cold water supplies is decreased as the total flow rate is reduced.

Contoured apertures in a pair of disc plate valves have been known to contour the water flow profile between the hot and cold water supplies. However, these plate valves are set to move both rotatably and translationally with respect to each other to mechanically control both the total flow rate and the temperature mix of the hot and cold water.

What is needed is a compact thermostatic valve that is easily assembled and controls the temperature of the mixed water output. What is also needed is a thermostatic control built into a valve with flow control that provides proper thermostatic control at all flow rates.

SUMMARY OF THE DISCLOSURE

In accordance with one aspect of the invention, a thermostatic mixing valve includes a base having two supply ports for connection with hot and cold water supplies. A handle body is rotatably mounted onto the base and operably connected to a first valving surface with a first and second inlet passage therethrough for hot and cold water supplies. The first valving surface is operably positioned adjacent the two supply ports for controlling total flow rate of the water into the mixing valve.

A second annular valving surface is axially movable within the handle between a first seat in proximity to a first axial end of the annular valving surface and a second seat in proximity to a second axial opposite end of the annular valving surface for controlling relative proportion of fluid from said first and second inlets. The first inlet passage passes axially by the first seating surface within radial extent of the annular valving surface and has a downstream end in fluid communication with the first seat and the first axial end of the annular valving surface to provide a first flow path between the first seat and the annular valving surface from radially within the annular valving surface to radially outside of the annular valving surface to a mixing chamber.

The second inlet passage passes axially by the first seating surface and through the interior of the annular valving surface within radial extent of the annular valving surface and has a downstream end in fluid communication with the second seat and the second axial end of the annular valving surface to provide a second flow path between said second seat and said annular valving surface from radially within the annular valving surface to radially outside of the annular valving surface to the mixing chamber.

The first inlet passage is sealed with respect to the second inlet passage from the supply ports to the mixing chamber and within the interior of the annular valving surface.

A thermostat element is axially movably disposed within the mixing chamber and operably connected to the annular valving surface to move the annular valving surface axially between the first and second seats for controlling the relative flow from the first and second inlet passages into the mixing chamber in response to the temperature of fluid in the mixing chamber. The mixing chamber is in fluid communication with an outlet.

Preferably, the thermostatic mixing valve includes an internal body section having an upper annular flange that forms the second seat above an annular downstream end of the second inlet passage. The internal body section has an annular lower flange forming the first seat below an annular downstream end of the first inlet passage. The internal body section has an annular middle flange forming a seal with the annular valving surface to seal the annular downstream end of the respective inlet passages from each other within the radial confines of the annular valving surface.

In one embodiment, the internal body section has a central outlet passage extending therethrough in fluid communication with the mixing chamber. The thermostat element extends axially down into the outlet passage of the internal body section and is connected to said annular valving surface through a collar member with the collar member having apertures therethrough to provide flow of fluid from said first inlet passage through the mixing chamber and into the outlet passage that is operably connected to the outlet.

In accordance with another aspect of the invention, a thermostatic mixing valve has a cold water inlet port and a hot water inlet port in communication with a base having two supply ports. A handle body is rotatably mounted onto the base and is operably connected to a first valving surface with two inlet passages therethrough that are operably positioned adjacent the two supply ports for controlling total flow rate into the housing. A thermostat element is operably connected to a second valving surface to move the second valving surface between a first and second seat for controlling the relative flow from the first and second inlet passages in response to the temperature of fluid in the mixing chamber.

The ports and the first valving surface are incorporated in two concentrically mounted plates that can be rotated with respect to each other and provided with openings therethrough for the controlled passage of the fluid through the two plates. At least one of the openings is shaped to modify the ratio of fluid flow through the first and second inlet passages such that the modification counters the tendency toward a variation in the ratio of the flow rates through the first and second inlet passages as a consequence of only the change of flow rates through the first and second inlet passages.

In one embodiment, the respective cold water passage is throttled less than the hot water passage during motion of the movable plate from full flow position to a closed position. In an alternate embodiment, the respective hot water passage is throttled less than the cold water passage during motion of the movable plate from full flow position to a closed position.

In another embodiment, the respective hot water passage resistance to fluid flow increases with the reciprocal displacement angle of the plates from the maximum flow position toward the closing position, while the resistance in the respective cold water passage remains substantially constant. Alternatively, the respective cold water passage resistance to fluid flow increases with the reciprocal displacement angle of the plates from the maximum flow position toward the closing position, while the resistance in the respective hot water passage remains substantially constant.

In this fashion, a compact thermostatic cartridge is available. The cartridge can be housed in a mixer valve flow regulator with volume or flow rate control disc plates that have contoured apertures to assure set flow ratios between the hot and cold water supplies independent of the total flow rate through the disc plates.

BRIEF DESCRIPTION OF THE DRAWINGS

Reference now is made to the accompanying drawings in which.

DETAILED DESCRIPTION OF THE PREFERRED EMBODIMENT

Figure 1:
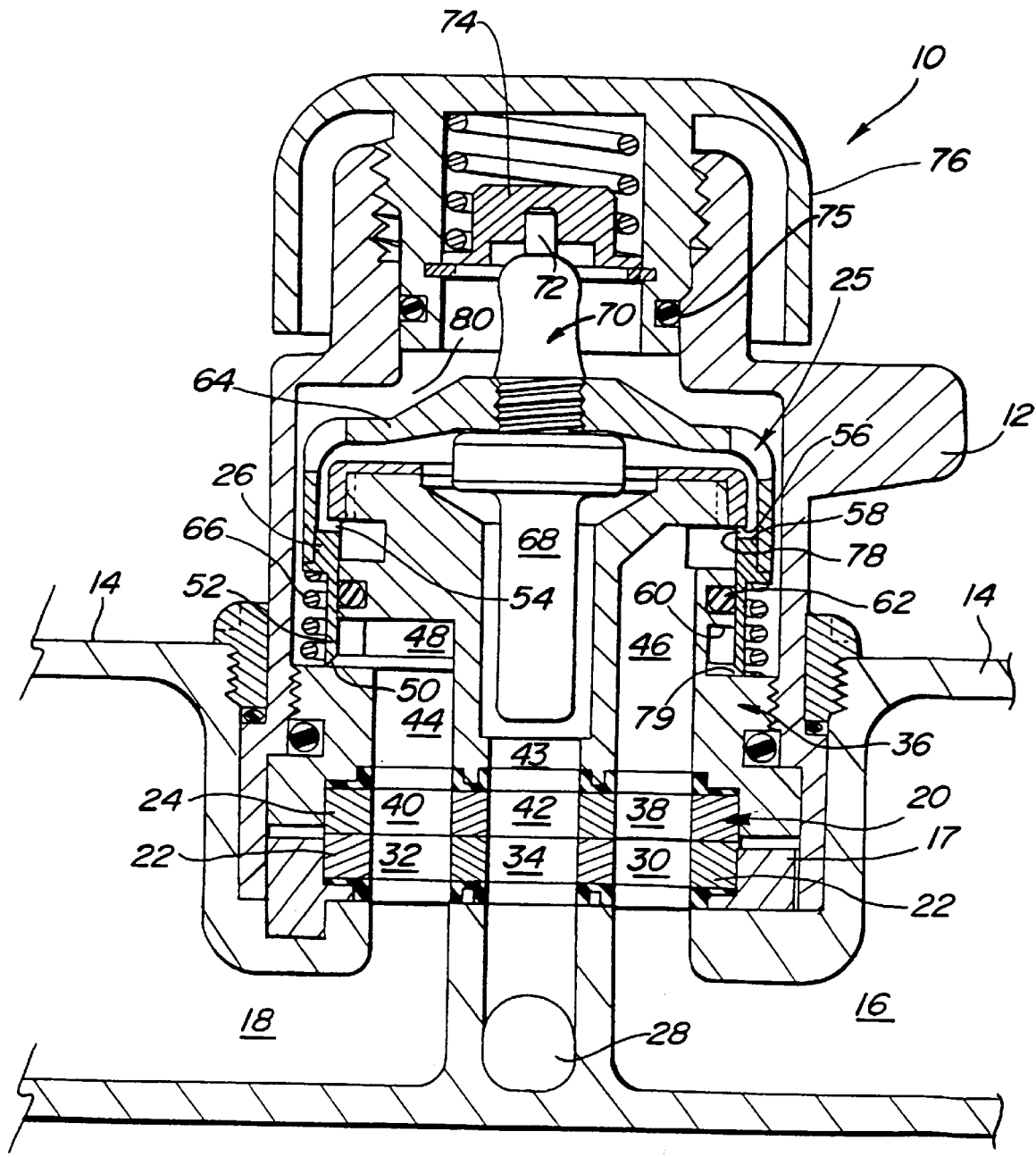
FIG. 1 is a side segmented view of a thermostatic mixing valve in accordance with one embodiment of the invention.
Figure 2:
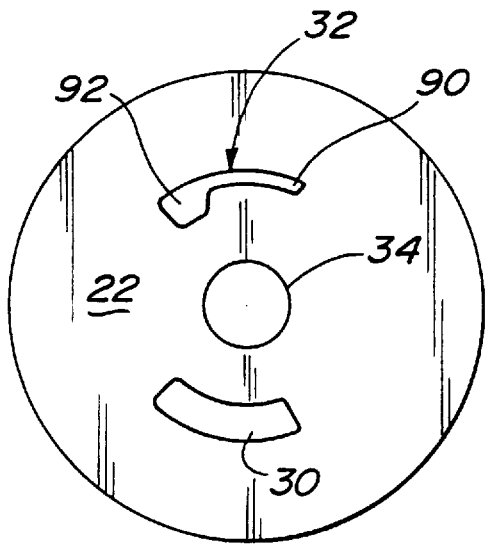
FIG. 2 is a plan view of a fixed plate for the flow rate regulation shown in FIG. 1.

Referring to FIGS. 1 and 2, a thermostatic mixing valve 10 includes a handle body 12 that is rotatably mounted in piping fixture or other suitable piping fixture 14. The piping fixture 14 includes a cold water supply 16 and hot water supply 18. The handle body 12 is rotatably mounted to a faucet base 17 that is affixed within the fixture 14. The mixing valve includes a flow rate control valve 20 that includes two ceramic disc plates 22 and 24. Fixed ceramic disc plate 22 is mounted in base 17. Rotatable ceramic disc plate 24 is mounted to a bottom of a cartridge assembly 25. The cartridge assembly 25 includes a thermostatic controlled second valve 26 is mounted downstream from the flow control valve 20 within the handle body 12 to control the temperature of the mixed water flowing to an outlet passage 28. The thermostatic valve is described in detail in PCT Publications WO 95/30940 and 95/30939 and is incorporated herein by reference.

The fixed ceramic disc plate 22 has respective cold and hot supply ports 30 and 32 and a centrally located mixed water outlet port 34. The ceramic disc plate 24 is affixed to the rotatable handle body 12 via an internal body member 36 of the cartridge assembly 25 for rotation with the handle body 12. The movable ceramic disc plate 24 has a cold water inlet 38 and hot water inlet 40 and a centrally located outlet aperture 42 that is in constant alignment with outlet port 34 of fixed ceramic disc plate 22. The rotation of the handle body 12 rotates the ceramic disc plate 24 with respect to disc plate 22 selectively align or misalign the inlets 38 and 40 with inlets 30 and 32 to control the total flow rate of the hot and cold water. The details of the contour of the supply ports 30 and 32 and the inlets 40 and 42 through the two ceramic disc plates 22 and 24 is described in more detail as follows.

The internal body member 36 has a hot water inlet passage 44 aligned with the hot water inlet 40 and a cold water inlet passage 46 aligned with the cold water inlet 42. A central mixed water outlet 43 is in alignment with outlets 42, 34 and 28. The passage 44 has an annular shaped downstream end 48 adjacent an annular valve seat 50 in internal body member 36 and the axial lower end 52 of thermostatically controlled valve 26 which is annular in shape. The passage 46 has an annular shaped downstream end 54 adjacent an annular valve seat 56 and the axial upper end 58 of the annular shaped valve 26. Valve seat 56 is secured to the internal body member 36. The passage 46 passes axially through the annular valve 26 within its radial confines. The internal body member 36 has an intermediate seal seat 60 that seats a seal 62 that seals off the passage 44 from 46 within the axial extent of the annular valve 26.

The annular valve 26 is affixed to a collar 64 via a threaded engagement. A spring 66 biases the valve 26 to engage the seat 56 and close off passage 46. The collar extends above the internal body section and is operatively affixed to body section 68 of thermostatic element 70. The thermostatic element has an expanding piston leg 72 that engages a safety spring release seat 74 that is mounted in adjustment handle 76. The adjustment handle 76 is screwed onto handle body 12 with an appropriate seal 75 for mechanically raising and lowering the thermostatic assembly 70 within the cartridge assembly 25. The body section 68 may extend into the central outlet passage 42 of the internal body 36.

The cartridge assembly 25 maintains its structural integrity because the annular valve 26 is entrapped between the internal body valve seat 50 and the upper seat 56. The thermostatic element 70 is affixed to the collar which in turn is affixed to the annular valve 26. The spring element 66 is also entrapped between the internal body 36 and the valve 26.

The water flow from the cold water supply 16 passes up through the control valve 20 and axially upward through the internal body member with the cold water passing radially outward through the adjustably sized gap 78 between the seat 50 and annular valve 26 and into mixing chamber 80. The flow path from the hot water supply 18 passes through the control valve 20 and axially upward through the internal body member with the hot water passing radially outward through the adjustably sized gap 79 between the seat 56 and annular valve 26 to mixing chamber 80.

The water thereafter is mixed and passes back radially inwardly to the center outlet passage 42 and out of the cartridge 25 and mixing valve 10. The thermostatic adjustment automatically slides the valve 26 axially to adjust the size of the two gaps 78 and 79. The specific internal construction of the thermostatic element 70 is well known in the art and is commercially available.

The volume control valve 20 when in the closed position prevents any communication between water supplies 16 and 18 and thus the faucet need not be provided with non-return valves.

Reference now is made to FIGS. 3–10 for a more detailed description of the ceramic disc plates 22 and 24 and the shape and operation of the ports 30 and 32 in the fixed plate 22 and inlets 38 and 40 in the movable plate. For ease of illustration, the two plates are shown as having different diameters but it is understood that the diameters of the respective plates are not critical to the invention and they may have the same diameter.

Figure 3:
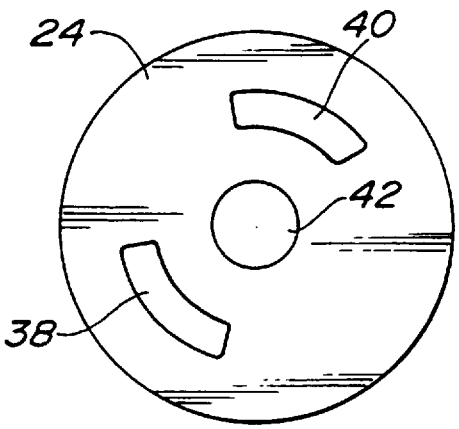
FIG. 3 is a plan view of the movable plate shown in FIG. 1.

As was described earlier, the reduction of the flow in most circumstances causes a rise in the temperature of the mixed water and it is this rise that must be corrected. FIG. 2 shows the two ports 30 and 32. Ports 30 has the usual arched shape with constant width. Opening 32 however has a particular configuration disclosing one embodiment of the invention. Section 90 has a constant and reduced width and expands into section 92 with an enlarged width. As shown in FIG. 3, the movable plate 24 has two inlets 38 and 40 whose configuration is the usual one with an arch of constant width.

Figure 4:
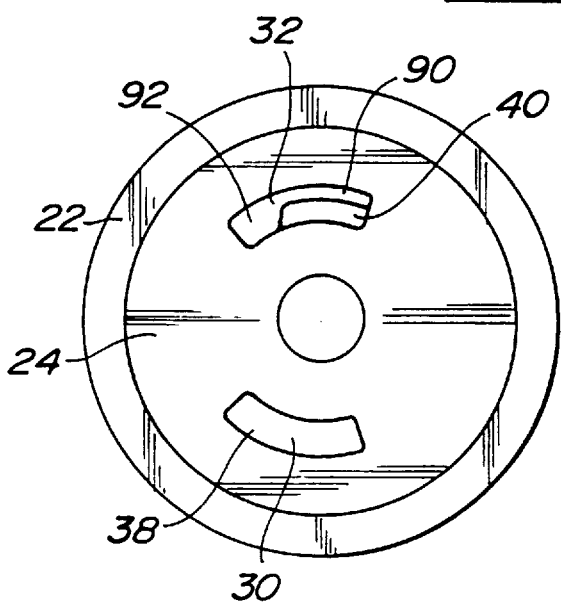
FIG. 4 is a plan view of the two plates shown in an operating and fully open position.
Figure 5:
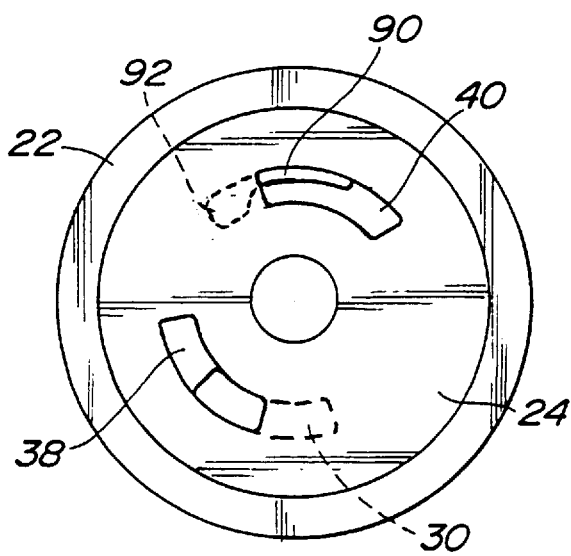
FIG. 5 is a view similar to FIG. 4 with the plates shown in the partially closed position.

FIG. 4 show the two plates superimposed onto each other at the full flow condition with the ports 30 and 32 fully aligned with inlets 38 and 40. As the movable plate is rotated to the position shown in FIG. 5, the free cross-section through the ports 30 and inlet 38 varies directly in proportion to the displacement angle as is usually found in volume control valves. On the other hand, the hot water passage through port 32 and inlet 40 is throttled a greater proportion because at the start of the displacement, the wider part 92 was covered by movable plate 24 until as shown in FIG. 5 only the narrower part remains uncovered with respect to inlet 40. Consequently, the hot water supply flow volume is reduced or throttled at the beginning of the regulation action by a greater amount than the throttling of the cold water supply flow. This difference in throttling counteracts the tendency toward a rise in the temperature of the mixed water in terms of diminishing the mixed water flow rate. The width and extent of the sections 90 and 92 can be profiled so as to compensate in the best fashion, the tendency toward a rise in the temperature of the mixed water and to enable the thermostatic device to correct any residual variation.

If one now considers that port 30 and inlet 38 are used for the passage of the hot water supply flow and port 32 and inlet 40 are used for the cold water supply flow, the identical behavior and compensation can be provided if the rotation of the movable valve disc is in the reverse direction. In this situation, as the movable plate is rotated in this reverse direction, the free cross-section through the ports 30 and inlet 38, now supplying hot water, varies directly in proportion to the displacement angle as is usually found in volume control valves. On the other hand, the passage through port 32 and inlet 40 (now supplying cold water) is throttled a lesser proportion because at the start of the displacement, the narrower section 90 is covered by movable plate 24 until only the wider section 92 remains uncovered with respect to inlet 40. Consequently, the hot water supply flow volume is reduced or throttled at the beginning of the regulation action by a greater amount than the throttling of the cold water supply flow to achieve the same effect as before described.

Furthermore, it should be noted that although the contoured port 32 is shown in fixed plate 22, the same effect can be achieved with the port 40 in the movable disc plate being contoured instead.

It should also be understood that the same effect can be accomplished by contouring either port 30 or inlet 38 provided that the contour is in the reverse fashion so that the hot water supply is throttled more than the cold water supply i.e. that the cold water is throttled less than the hot water supply as the valves are moved from the full on position toward the closed position.

While previous discussion has been limited to one port opening, it is foreseen that both ports in the same plate can be contoured or one contoured port can belong to one plate while the other contoured port can belong to the other plate. Furthermore, the ports of both plates may be cooperatively contoured to achieve the desired results of changing the ratio of flows.

Figure 6:
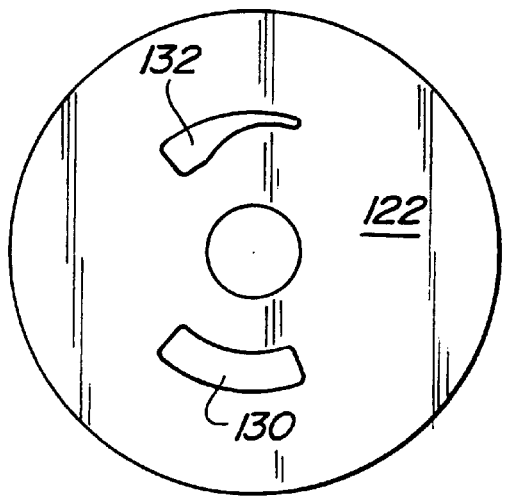
FIG. 6 illustrates a second embodiment of the fixed plate.

FIG. 6 illustrates an embodiment of plate 122 similar to the one shown in FIG. 3. The port 132 however has a gradual variable width. In the case, the resultant effect is the same as in the preceding case, but is more regularly sloped along the pertinent displacement arc of the two plates.

The above discussed examples disclose plates for unproportional variation of the flow for the hot and cold waters by varying the width of at least one port to vary the free cross-sectional overlap offered between the water supply and the internal passage through the valve. Another fashion to accomplish the unproportional variation is to vary the resistance in one passage relative to the other passage.

Figure 7:
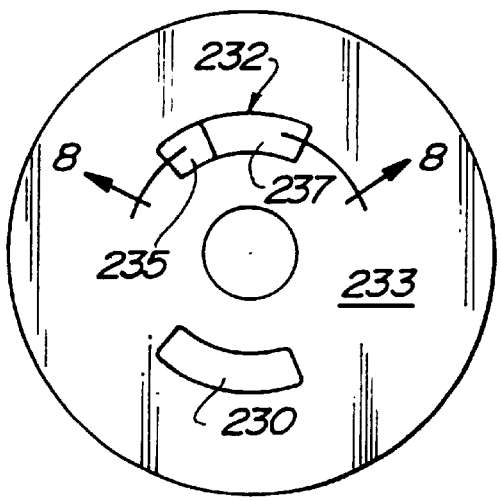
FIG. 7 illustrates a third embodiment of the fixed plate.
Figure 8:
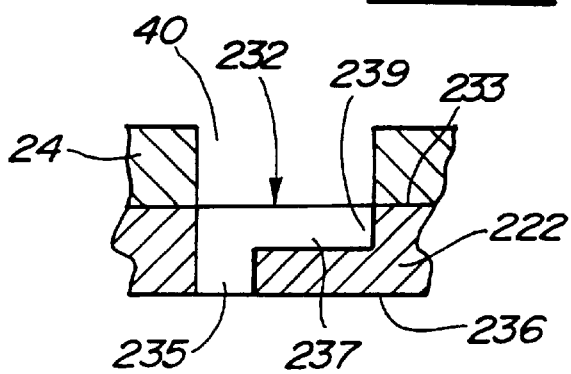
FIG. 8 is a cross sectional view taken along lines 8—8 shown in FIG. 7 and showing the movable plate in the fully open position.
Figure 9:
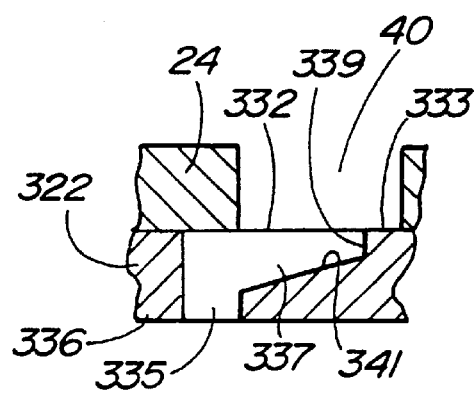
FIG. 9 is a view similar to FIG. 8 illustrating a modified profile of the port through the fixed plate shown in FIG. 8 with the movable plate moved to a partially closed position.

Referring to FIGS. 7 and 8, the width of port 232 at face 233 in plate 222 is uniform as shown in FIG. 7. However as shown in FIG. 8, the port 232 is steeped such that at the opposite face 236, a reduced or throttled open area 235 exists which empties out into region 237 at face 233. The resistance against the flow keeps increasing gradually as the free cross-section of the passage shifts from directly over throttled section 237 toward only the distal end 239 of region 237. The result is substantially identical to the one accomplished by the variation of the width of the port in its various regions. The port can be further modified as shown in FIG. 9 where the port 332 has throttled region 335 that opens up into region 337. The floor 341 of region 337 is sloped from region 235 to distal end 339 to achieve a variation rate that may be more desirable in particular circumstances.

The configurations illustrated in FIGS. 6–9 can be associated with the variations in the cross-section of the ports rather than used as a substitution of the variation in width.

In other words, the various features my be combined with each other to produce the variation in relative flow rates.

In this fashion, a thermostatic valve for a mixing faucet is able to correct the temperature of the outlet water for more varieties of plumbing conditions and water supplies. The invention increases the viability of thermostatic control valves where its mere action without the inventive concept is not sufficient to maintain the outlet water at the preselected or desired temperature.

Other variations and modifications are possible without departing from the scope and spirit of the present invention as defined by the appended claims.

The embodiments in which an exclusive property or privilege is claimed are defined as follows:

1. A thermostatic mixing valve characterized by:

a base having two supply ports;

a rotatable handle body mounted onto said base and operably connected to a first valving surface with two inlet passages therethrough that are operably positioned adjacent said two supply ports for controlling volume flow into said housing;

a second annular valving surface axially movable within said handle between a first annular seat in proximity to a first axial end of the annular valving surface and a second annular seat in proximity to a second axial opposite end of the annular valving surface for controlling relative proportion of fluid from said first and second inlets;

said first inlet passages passing up through said first seating surface within radial extent of said annular valving surface and having a downstream end in fluid communication with said first seat and said first axial end of said annular valving surface about a full circumference of said annular valving surface and valve seat to provide a first annular flow path between said first seat and said annular valving surface from radially within said annular valving surface to radially outside of said annular valving surface to a mixing chamber;

said second inlet passage passing up through said first seating surface and through the interior of said annular valving surface within radial extent of said annular valving surface and having a downstream end in fluid communication with said second seat and said second axial end of said annular valving surface about a full circumference of said annular valving surface and said second seat to provide a second annular flow path between said second seat and said annular valving surface from radially within said annular valving surface to radially outside of said annular valving surface to said mixing chamber;

said first inlet passage being sealed within the interior of said annular valving surface with respect to said second inlet passage from said supply ports to said mixing chamber;

a thermostat element axially movably disposed with the mixing chamber and operably connected to said annular valving surface to move said annular valving surface axially between said first and second seats for controlling the relative flow from the first and second inlet passages into said mixing chamber in response to the temperature of fluid in said mixing chamber;

said mixing chamber in fluid communication with an outlet exiting therefrom;

said ports and said first valving surface being incorporated in two concentrically mounted plates that can be rotated with respect to each other and provided with openings therethrough for the controlled passage of the fluid through the two plates;

at least one of the opening is shaped to modify the ratio of fluid flow through the first and second inlet passages such that it counters the tendency toward a variation in the ratio of the flow rates through the first and second inlet passages as a consequence of only the change of total flow rate through the first and second inlet passages.

2. A thermostatic mixing valve as defined in claim 1 further characterized by:

the respective openings for cold water passage are throttled more quickly than the openings for hot water passage during motion of the movable plate from full flow position to a closed position.

3. A thermostatic mixing valve as defined in claim 1 further characterized by:

the respective openings for hot water passage are throttled more quickly than the openings for cold water passage during motion of the movable plate from full flow position to a closed position.

4. A thermostatic mixing valve as defined in claim 1 further characterized by:

the respective hot water passage resistance to fluid flow increases with the reciprocal displacement angle of the plates from the maximum flow position toward the closing position, while the resistance in the respective cold water passage remains substantially constant.

5. A thermostatic mixing valve as defined in claim 1 further characterized by:

the respective cold water passage resistance to fluid flow increases with the reciprocal displacement angle of the plates from the maximum flow position toward the closing position, while the resistance in the respective hot water passage remains substantially constant.

6. A thermostatic mixing valve having a cold water inlet port and a hot water inlet port characterized by:

a base having two supply ports;

a rotatable handle body mounted onto said base and operably connected to a first valving surface with a hot water and cold water inlet passage therethrough that are operably positioned adjacent said two supply ports for controlling volume flow into said housing;

a thermostat element operably connected to a movable second valving surface that is movable between first and second seats for controlling the relative flow from the cold and hot water inlet passages in response to the temperature of fluid in a mixing chamber;

said ports and said first valving surface being incorporated in two concentrically mounted plates that can be rotated with respect to each other and provided with openings therethrough for the controlled passage of the fluid through the two plates;

at least one of the opening is shaped to modify the ratio of fluid flow through the hot and cold water inlet passages such that it counters the tendency toward a variation in the ratio of the flow rates through the hot and cold water inlet passages as a consequence of only the change of total flow rate through the first and second inlet passages.

7. A thermostatic mixing valve as defined in claim 6 further characterized by:

the respective openings for the cold water inlet passage are throttled more quickly than the openings for hot water inlet passage during motion of the movable plate from full flow position to a closed position.

8. A thermostatic mixing valve as defined in claim 6 further characterized by:

the respective openings for hot water passage are throttled more quickly than the openings for cold water inlet passage during motion of the movable plate from full flow position to a closed position.

9. A thermostatic mixing valve as defined in claim 6 further characterized by:

the respective hot water inlet passage resistance to fluid flow increases with the reciprocal displacement angle of the plates from the maximum flow position toward the closing position, while the resistance in the respective cold water inlet passage remains substantially constant.

10. A thermostatic mixing valve as defined in claim 6 further characterized by:

the respective cold water inlet passage resistance to fluid flow increases with the reciprocal displacement angle of the plates from the maximum flow position toward the closing position, while the resistance in the respective hot water inlet passage remains substantially constant.

\* \* \* \* \*